United States Patent
Jaeger (10) Patent No.: US 9,377,219 B2
(45) Date of Patent: Jun. 28, 2016

(54) CLEANING APPARATUS

(76) Inventor: Anton Jaeger, Senden (DE)

(*) Notice: Subject to any disclaimer, the term of this patent is extended or adjusted under 35 U.S.C. 154(b) by 282 days.

(21) Appl. No.: 13/486,451

(22) Filed: Jun. 1, 2012

(65) Prior Publication Data
US 2012/0311799 A1 Dec. 13, 2012

(30) Foreign Application Priority Data

Jun. 7, 2011 (DE) .......................... 10 2011 103 537

(51) Int. Cl.
*A46B 13/06* (2006.01)
*F24J 2/46* (2006.01)
*B08B 1/04* (2006.01)
*A46B 13/00* (2006.01)

(52) U.S. Cl.
CPC .............. *F24J 2/461* (2013.01); *A46B 13/001* (2013.01); *A46B 13/06* (2013.01); *B08B 1/04* (2013.01); *Y02E 10/40* (2013.01)

(58) Field of Classification Search
CPC ....... A46B 13/02; A46B 13/06; A46B 13/001
USPC ......................................... 15/4, 24, 50.3, 88.4
See application file for complete search history.

(56) References Cited

U.S. PATENT DOCUMENTS

| | | | |
|---|---|---|---|
| 1,817,644 A * | 8/1931 | Pope | ................................. 15/24 |
| 1,839,768 A | 1/1932 | Major | |
| 2,723,407 A * | 11/1955 | Bardon | ............................. 15/24 |
| 4,374,444 A | 2/1983 | Zhadanov | |
| 4,573,235 A * | 3/1986 | Baird et al. | ..................... 15/328 |
| 4,597,127 A | 7/1986 | Swanson | |
| 5,007,127 A | 4/1991 | Paolo | |
| 6,862,769 B1 | 3/2005 | Dalton, Sr. | |
| 2003/0028982 A1 | 2/2003 | Kress | |

FOREIGN PATENT DOCUMENTS

| | | |
|---|---|---|
| DE | 26 56 255 A1 | 6/1978 |
| DE | 33 31 402 A1 | 3/1985 |
| DE | 20 2009 008 001 U1 | 9/2009 |
| EP | 0755835 A1 | 1/1997 |
| EP | 2147625 A1 | 1/2010 |
| JP | 2000 219107 A | 8/2000 |
| KR | 1020100132258 | 4/2011 |
| NL | 9 101 373 A | 3/1993 |

OTHER PUBLICATIONS

Translation of German Search Report dated May 7, 2012 relating to DE 10 2011 103 537.4.

* cited by examiner

*Primary Examiner* — Randall Chin
(74) *Attorney, Agent, or Firm* — Dinsmore & Shohl LLP (57) ABSTRACT

The invention relates to an apparatus for cleaning surfaces, having a cleaning head which includes at least one base part and at least one brush arrangement, in particular a cylindrical brush roller, attached to the base part; and a fluid drive for the brush arrangement which is at least partly integrated into the base part and which is designed to convert the flow energy of a fluid supplied to the base part under pressure into a cleaning movement of the brush arrangement.

28 Claims, 5 Drawing Sheets

CLEANING APPARATUS

CROSS-REFERENCE TO RELATED APPLICATIONS

This application claims priority of German Patent Application No. 10 2011 103 537.4 filed Jun. 7, 2011.

FIELD OF THE INVENTION

The invention relates to an apparatus for cleaning surfaces having a cleaning head which includes at least one base part and at least one brush arrangement, in particular a cylindrical brush roller, attached to the base part.

BACKGROUND OF THE INVENTION

Such apparatus are generally known and are used, for example, for cleaning solar collectors. The cleaning of solar collectors is becoming increasingly important so that there is an increasing need for efficient possibilities and possibilities which are as inexpensive as possible for cleaning such solar collectors.

It must inter alia be taken into account in this respect that in practice the individual modules of solar collectors have different widths so that a cleaning apparatus should provide the possibility of being able to be used without losses in efficiency and handling on solar collectors with modules of different widths. It is furthermore possible that working with the cleaning apparatus can take place as fast and as simply as possible to minimize the cleaning costs. If the cleaning takes place with the assistance of a fluid, in particular water, care should additionally be taken that the water consumption is as small as possible; however, without impairing the cleaning effect.

SUMMARY OF THE INVENTION

It is thus the object of the invention to further develop a cleaning apparatus of the initially named kind such that a cleaning in particular of solar collectors is made possible in a manner which is as simple and as inexpensive as possible.

In accordance with the invention, a fluid drive for the brush arrangement is provided which is at least partly integrated into the base part and which is designed to convert the flow energy of a fluid supplied to the base part under pressure into a cleaning movement of the brush arrangement.

The brush arrangement can in particular be one or more brush rollers which is/are rotatably supported at the base part and which are moved over the respective surface to be cleaned manually or automatically under continuous rotation during the cleaning procedure.

It is possible by the fluid drive integrated in accordance with the invention to use a fluid, in particular water, anyway required to assist the cleaning additionally to generate the cleaning movement of the brush arrangement in particular the rotation of one or more brush rollers. Heavy and expensive electric motors for driving the brush arrangement can be dispensed with. A further simplification is achieved in that only the supply of the fluid to the brush arrangement has to be taken care of. Additional supply lines are not necessary. This reduces the weight of the cleaning apparatus in accordance with the invention and simplifies its handling.

Further possible embodiments of the invention are also set forth in the dependent claims, in the description and in the drawing.

Some aspects of the invention can inter alia be described in the following for which protection is claimed both independently and in generally any desired combination. These aspects in particular make it possible to further develop a cleaning apparatus in accordance with the invention such that the cleaning effect is improved, the handling is facilitated and/or the manufacturing costs and/or operating costs are reduced.

In accordance with an embodiment of the invention, a set of a plurality of brush modules is provided which can be axially coupled to one another to be respectively combined to form a brush arrangement. The working width of the brush arrangement can thus be varied and adapted to the respective object to be cleaned by the selection of a suitable number and a suitable type of brush modules. It is thus possible in a simple and inexpensive manner to adapt the cleaning apparatus to the respective width of the modules or of the so-called panels of a solar collector.

The set of brush modules can include at least one base module coupled or couplable to the base part, at least one axially outwardly closed end module as well as at least one intermediate module coupled or couplable between the end module and the base module.

The coupling between the individual brush modules can in particular take place by screwing. This can be made possible without tools in that the brush modules include a receiver having an internal thread at one axial end and a screw connection having an external thread at the other axial end, or vice versa, so that the brush modules can be simply screwed to one another.

In accordance with a further aspect of the invention, provision can be made that the base part is arranged between two brush arrangements, in particular centrally, with the axial region taken up by the base part being at least substantially covered by the bristles of at least one of the brush arrangements.

A symmetrical arrangement advantageous with respect to cleaning effect and handling can hereby be provided to the extent that the base part is arranged between two brush modules. An advantage of this arrangement is that a single fluid drive can simultaneously drive both brush arrangements and can in particular set them into rotation. Costs and weight can hereby be saved. Such an arrangement having a base part arranged between two brush arrangements initially, however, brings about the potential problem that the axial region taken up by the base part is not available for cleaning the respective area. The cleaning apparatus can thus leave a streak on the surface which is not acted on by the brush arrangements and which has to be eliminated by a subsequent cleaning procedure. In other words, care must be taken that work is carried out with a relatively large overlap. This increases the cleaning effort and consequently the costs for the cleaning, in particular of solar collectors arranged on inclined building roofs since the remaining streak can have the result that the advantage of a relatively large working width acquired by the brush arrangements provided at both sides is nullified again. The measure proposed in accordance with the invention to at least substantially cover the axial region taken up by the base part by the bristles of at least one of the brush arrangements eliminates the above-explained problem of "streak formation".

It was not foreseeable for the skilled person that, on the use of a fluid drive providing only a relatively limited power in practice, such a coverage of the axial region is possible when this axial region is additionally used for the supply of the fluid to the base part, i.e. when a fluid supply line formed in whatever specific manner is conducted between the brush arrangements to the base part or to the fluid drive integrated at least partly into the base part. It was surprisingly found that the interaction thereby induced of the bristles, in particular of the rotating bristles, with the fluid supply does not have the consequence of any reduction of the working power which would make the practical use of the cleaning apparatus questionable.

Not only one of the brush arrangements has to be used for the covering of the axial region. It is rather preferred, albeit not compulsory, that the bristles of both brush arrangements arranged at both sides of the base part cover the axial region together.

Provision is made in a preferred embodiment that at least some of the bristles of the brush arrangements disposed in the region of the base part extend at a slant and/or are directed or inclined toward one another. This represents a surprisingly simple and effective measure to achieve the desired freedom from streaks.

Provision is made in a further embodiment that sections of the bristles disposed furthest axially inwardly extend into planes disposed directly opposite one another or pass through one another. The bristles of the brush arrangements provided at mutually opposite sides of the base part can therefore either run directly past one another while minimizing or eliminating an axial gap or can project into one another. Since, in a preferred embodiment, both brush arrangements are moved in the same manner, in particular rotate in the same direction, such a brush penetration does not result in losses in performance. It is nevertheless possible within the framework of the invention to allow the two brush arrangements to rotate in opposite senses. It was surprisingly found that there is no real loss in performance in such a case despite the brushes mutually impairing one another in principle in the region of the base part on rotation in opposite senses.

A particularly advantageous optimization of the cleaning apparatus in accordance with the invention is achieved by an embodiment in which provision is made that the fluid drive is divided into a driven part associated with the base part and a driving part associated with a fluid supply device, with the two parts of the fluid drive being releasably coupled or couplable to one another. A completion of the fluid drive ready for operation is thus given with a fluid supply device connected to the base part in accordance with the intended purpose. Such a division in particular makes it possible to implement a fluid supply to the fluid drive at least partly integrated into the base part which is extremely slim or narrow in construction. A free axial region between two brush arrangements arranged at both sides of the base part which can potentially result in streak formation can hereby be minimized in advance.

A further advantage of the named division is that at least the driving part of the fluid drive can be changed or replaced in a simple manner to adapt the working behavior of the cleaning apparatus, in particular the cleaning performance and/or the fluid consumption, to the respective use.

In an embodiment, the fluid drive has an elongated fluid expulsion member, in particular a pin-shaped expulsion member, which is arranged in the region of the base part, with in particular the fluid expulsion member including a nozzle.

While this fluid expulsion member is arranged in the region of the base part in cleaning operation, the fluid expulsion member can nevertheless represent the driving part associated with a fluid supply device in the sense of the division of the fluid drive generally disclosed above. The fluid expulsion member, in particular a nozzle, can be a separate, replaceable component. Alternatively, the fluid expulsion member can be an integral component of a fluid supply device specifically designed in whatever manner, in particular a lance or a supply line.

Provision is made in a further embodiment of the invention that the fluid expulsion member extends radially or tangentially with respect to an axis of rotation of the brush arrangement at least in the region of the base part.

The fluid expulsion member can be arranged at the end of a fluid supply line, in particular of a lance and/or of a holding rod, which is coupled or couplable to the base part by plugging together. For this purpose, the base part can include a plug receiver for the fluid supply line or for the fluid expulsion member, with generally a reverse design also being possible, i.e. the fluid supply line has a plug receiver into which a correspondingly formed plug-in part of the base part is to be introduced to assemble the cleaning apparatus ready for operation.

The fluid expulsion member can be replaceable, in particular to change the cleaning performance and/or the fluid consumption, with in particular a set of fluid expulsion members having different flow cross-sections being provided.

As already mentioned above, the fluid expulsion member can be a nozzle or a drive nozzle for acting on a turbine of the fluid drive. Possible nozzle sizes, i.e. diameters of a fluid outlet opening of the nozzle, are in particular in the range of 0.5 mm-1.5 mm. It was surprisingly found that even with a relatively small water consumption of 1.0-1.5 liters per minute a sufficiently high torque can be achieved for the rotary drive of two cylindrical brush rollers arranged at both sides of the base part. These indications and also following indications relate to a pressure of the water provided, for example, by a high-pressure cleaner of approximately 100 bar.

It must generally be noted that the cleaning apparatus is preferably designed in accordance with the invention, in particular in dependence on the respective nozzle used, such that the water consumption lies in the range between 1.0-6.0 liters. The outer diameters of rotating brush rollers are, for example, in accordance with the invention in the range from 120 mm-150 mm. A smaller outer diameter allows a smaller water consumption, with larger brush rollers having the advantage of a larger peripheral speed and thus a higher surface performance, i.e. without any impairment of the cleaning effect, large rotating brushes can be moved at higher speed over the respective surface to be cleaned than smaller rollers. Furthermore, with brush rollers with a large diameter with a relatively small water consumption, a comparatively large torque can be achieved at a fluid drive. The core diameter of the rotating brushes, in particular the outer diameter of a roller jacket carrying the brushes, amounts in particular to approximately 65 mm.

In particular in the case of the cleaning of inclined surfaces, the selection of the outer diameter of the brush rollers will in practice also be made in dependence on the angle of inclination of the surface to be cleaned.

As already mentioned above, the fluid drive can have a drive member, in particular a turbine or a paddle wheel, driven directly by the fluid. For the case that two brush arrangements are provided at both sides of the base part, it is in particular suggested to provide a single drive member which is driven directly by the fluid and by which both brush arrangements can be driven together.

In accordance with a further embodiment of the invention, the fluid drive can be operated in different directions of rotation, and indeed by rotation of a fluid supply line and/or of a fluid expulsion member, with this rotation in particular taking place by 180° about a longitudinal axis of the fluid supply line or of the fluid expulsion member.

Such a switching over between the opposite directions of rotation of the fluid drive can take place, for example, in that a fluid supply line bearing a fluid expulsion member at the end and/or a region of a fluid supply line and/or of a fluid expulsion member disposed in front of a fluid outlet in the flow direction extends at least substantially radially with respect to an axis of rotation of the brush arrangement and a fluid outlet is aligned such that the fluid drive, in particular a turbine or a bucket wheel, is acted on in a different sense of rotation in dependence on the rotational position of the fluid supply line and/or of the fluid expulsion member. The mentioned radial extent is not compulsory in this respect.

In other words, provision can be made in accordance with this embodiment that the fluid supply line or the fluid expulsion member, that is ultimately the direction in which the fluid leaves, can be adjusted so that the fluid drive is acted on by the exiting fluid either in the one direction or in the other direction. A turbine or a bucket wheel is, for example, therefore acted on either "from the front" or "from behind".

Provision is made in an embodiment that a drive member, in particular a turbine or a bucket wheel, of the fluid drive has bucket elements shaped neutrally with respect to the direction of rotation. The fluid drive is hereby equally suitable for a forward drive and a reverse drive.

In accordance with a further aspect of the invention, the brush arrangement can be provided with a splash protection device.

The splash protection device can include a cover disposed outside the bristles of the brush arrangement. It can generally extend over any desired angular range which is adapted in accordance with the respective specific embodiment of the cleaning apparatus and which can amount e.g. up to 180° or up to 360° with respect to an axis of rotation of one or more rotating brush rollers.

Alternatively or additionally, the splash protection device can include a scraper which projects at least partly into the bristles and relative to which the brush arrangement moves during the cleaning operation and which the bristle abuts during the cleaning operation. The bristles can hereby automatically be liberated from contamination or from contaminated cleaning fluid in a defining manner at a predefined point during the cleaning operation. In this respect, it is avoided in a particularly simple and effective manner that an uncontrolled spraying of the contaminations takes place and the clearing effect is immediately nullified again.

In accordance with a further embodiment of the invention, the base part includes an areal, in particular plate-shaped or disk-shaped reinforcement, in particular of metal, which is surrounded at least regionally by an outer part of plastic, in particular cast in plastic or overmolded by plastic.

BRIEF DESCRIPTION OF THE DRAWINGS

The invention will be described in the following by way of example with reference to the drawing. There are shown.

DETAILED DESCRIPTION OF THE PREFERRED EMBODIMENTS

Figure 1:
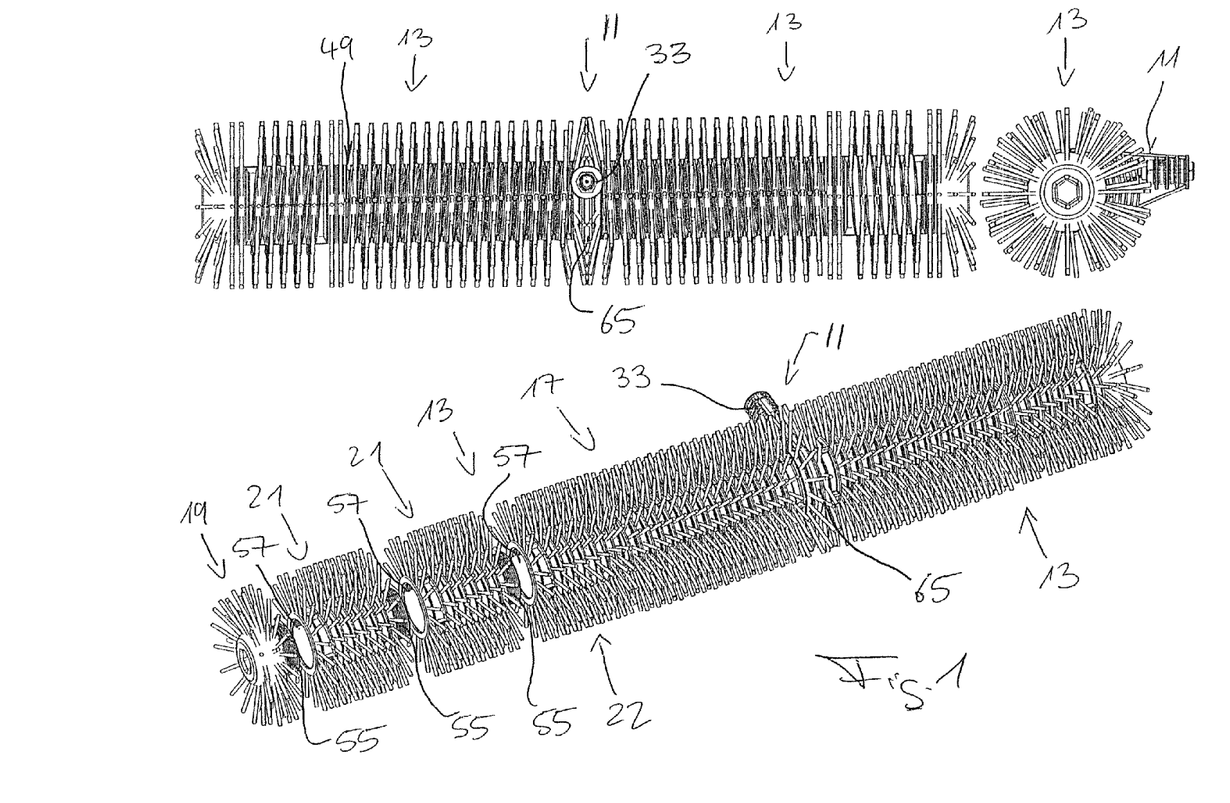
FIG. 1 different views of an embodiment of a cleaning apparatus in accordance with the invention.
Figure 2:
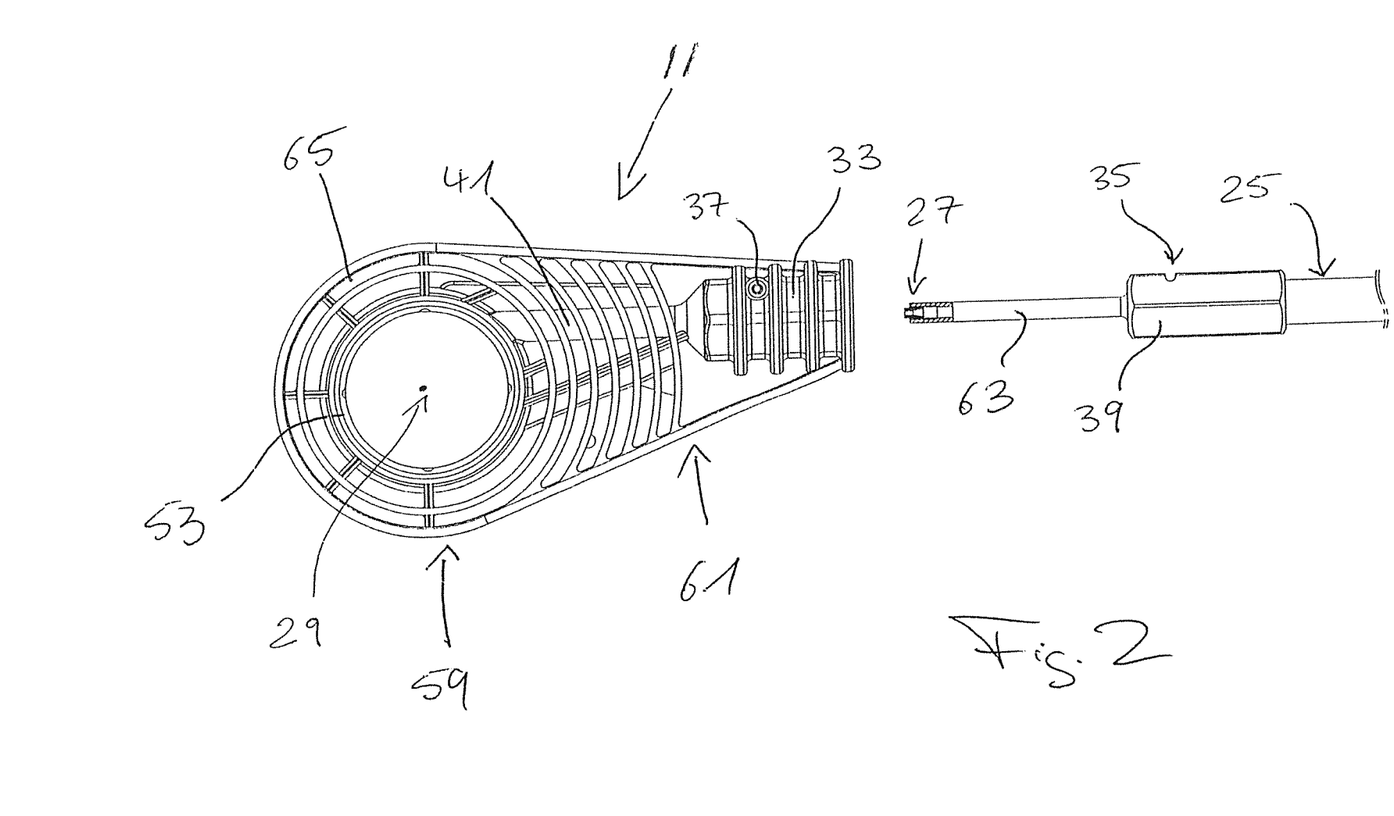
FIG. 2 a base part and a fluid supply line of a cleaning apparatus in accordance with the invention.

FIG. 1 shows an embodiment of a double brush or twin-brush of a cleaning apparatus in accordance with the invention which includes two brush arrangements 13 which are arranged at both sides of a base part 11 and are connected to the base part 11 such that a fluid drive (not shown in FIG. 1) integrated into the base part 11 can set both brush arrangements 13 simultaneously into a cleaning movement with the same sense of rotation, said cleaning movement being a rotational movement about a common axis of rotation 29 (cf. FIG. 2).

The structure and operation of the brush arrangements 13 and of the base part 11 will be explained in more detail in the following.

FIG. 1 in particular shows a modular structure of the brush arrangements 13 which serves to match the working width of the cleaning apparatus to the respective application. In the embodiment shown, each brush arrangement 13 includes a base module 17, two intermediate modules 21 and an end module 19. The modules can be screwed to one another. For this purpose, a respective screw section having an external thread 55 is provided which can be screwed to a screw section 57 of another module provided with an internal thread in order ultimately to couple any desired number of brush modules axially to one another in this manner and so to assemble them to a brush arrangement 13 having the respective desired working width.

The end module 19 is closed at the axial end side since the fluid drive and the base part 11 are configured such that fluid flowing into the base part 11 via a receiver section 33 explained in more detail in the following flows into the interior of an outer jacket 49 of the brush arrangement 13 provided with bristles after leaving the fluid drive in order there to exit via outlet openings, not shown, at the periphery of the outer jacket 49 and to be able to wet the bristles or the object to be cleaned.

Figure 3:
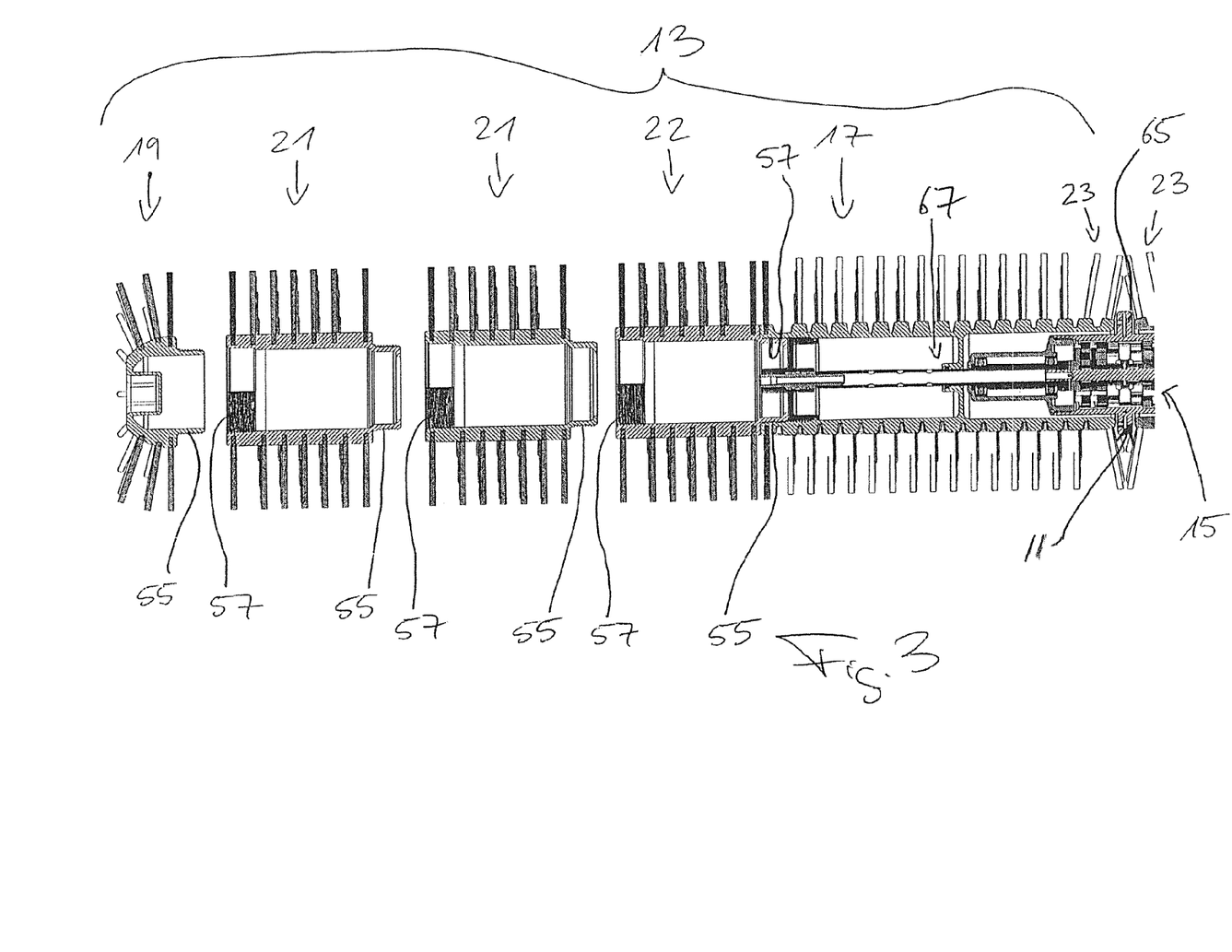
FIG. 3 an embodiment of a brush arrangement in accordance with the invention.

The base module 17 includes a transition module 22 which is releasably screwed to a section of the base module 17. The transition module 22 can to this extent be considered as a further intermediate module corresponding to the intermediate modules 21. The transition module 22 can in particular be designed as identical to or of the same construction as the intermediate modules 21. As FIG. 3 shows, there is a special feature of the transition module 22 in that it is screwed to that section of the base module 17 which holds a carrier arrangement at the axial end side which will be explained in more detail in the following and which has a plug 47, a connection piece 45 as well as a carrier rod 43 (cf. FIG. 4).

As FIG. 2 shows, the base part 11 includes a cylindrical section 59 whose center axis coincides with the axis of rotation 29 of the brush arrangements 13 and which includes, in a manner described in more detail in the following, an axially extending housing 53 (cf. FIGS. 4 and 5) for a fluid drive.

The base part 11 furthermore includes a substantially radially projecting feed section 61 which includes a leadthrough 41 extending tangentially with respect to the axis of rotation 29 as well as a receiving section 33 opening into the leadthrough 41 and having an enlarged cross-section.

The comparatively narrow leadthrough 41 serves for receiving a relatively thin, pen-shaped jet pipe section 63, whereas the receiving section 33 serves for receiving an extension 39 which is enlarged with respect to the diameter over the jet pipe section 63 and which merges into the jet pipe section 63 in the direction of flow of the fluid.

The jet pipe section 63 and the extension 39 are sections of a fluid supply line 25 at the end side which is in particular designed as a lance and via which the cleaning apparatus in accordance with the invention can be connected to a fluid pressure source, not shown, in particular to a commercial high-pressure cleaner.

In the embodiment shown, the end of the line 25 including the jet pipe 63 and the extension 39 extends tangentially to the axis of rotation 29 in the state plugged together with the base part 11.

The base part 11 is provided with a securing portion 37 in the region of the receiving section 33 which engages into a cut-out 35 of the extension 39 of the line 25 in the assembled state and prevents an unintentional pulling of the line 25 out of the base part 11.

A replaceable fluid expulsion member in the form of a nozzle element 27 is provided at the free end of the jet pipe 63. The outlet opening of the nozzle 27 serves as a fluid outlet which is aligned such that a turbine of the fluid drive not shown in FIG. 2 is acted on by a fluid jet. The mentioned fluid drive is arranged in that region of the cylindrical section 59 of the base part 11 which is surrounded by the housing 53 (cf. FIGS. 4 and 5).

The housing 53 is surrounded in a central region by a flat flange section 65 which is of the shape of a circular ring disk, which is connected to the cylindrical housing 53 in one piece and which projects radially from the housing 53, with the feed section 61 starting from the flange section 65 in the radial direction. Both the flange section 65 and the feed section 61 are made extremely narrow or thin in the direction of the axis of rotation 29 to minimize the axial region between the two brush arrangements (13) taken up by the base part 11 (cf FIG. 1).

The base part 11 is preferably made as a multicomponent element which includes an inner reinforcement, in particular in the form of a metal sheet, whose flat sides are orientated perpendicular to the axis of rotation 29. This metal sheet can be overmolded with plastic to realize the desired shape or structure. Overall, an extremely stable and in particular flexurally rigid design can hereby be achieved for the base part 11, with this being made possible with a conceivable low weight of the base part 11.

FIG. 3 shows a brush arrangement 13 which is arranged on one side of the base part 11 and thus forms one half of a double brush or twin brush of a cleaning apparatus in accordance with the invention.

In the embodiment shown, the brush arrangement 13 includes three brush modules 21, 22 of the same construction, with the brush module 22 being able to be termed a transition module to the extent that it is connected to the base module 17 which is connected by means of a carrier arrangement 67 to the base part 11 and can be set into rotation relative to the base part 11 by means of a fluid drive 15.

As can furthermore be seen from FIG. 3, the respective bristles of the two most axially inwardly disposed bristle disks of the base module are arranged inclined with respect to the axis of rotation 29, with these parts 23 of the bristles of the two brush arrangements 13 disposed in the region of the base part 11 being directed toward one another.

A covering of the axial region taken up by the base part 11 or by its flange section 65 between the two brush arrangements 13 hereby results overall, whereby a streak-free working with the double brush roller or twin-brush roller is ensured. In other words, the "gap" between the two brush arrangements 13 is "closed" by this arrangement of the bristles.

Figure 4:
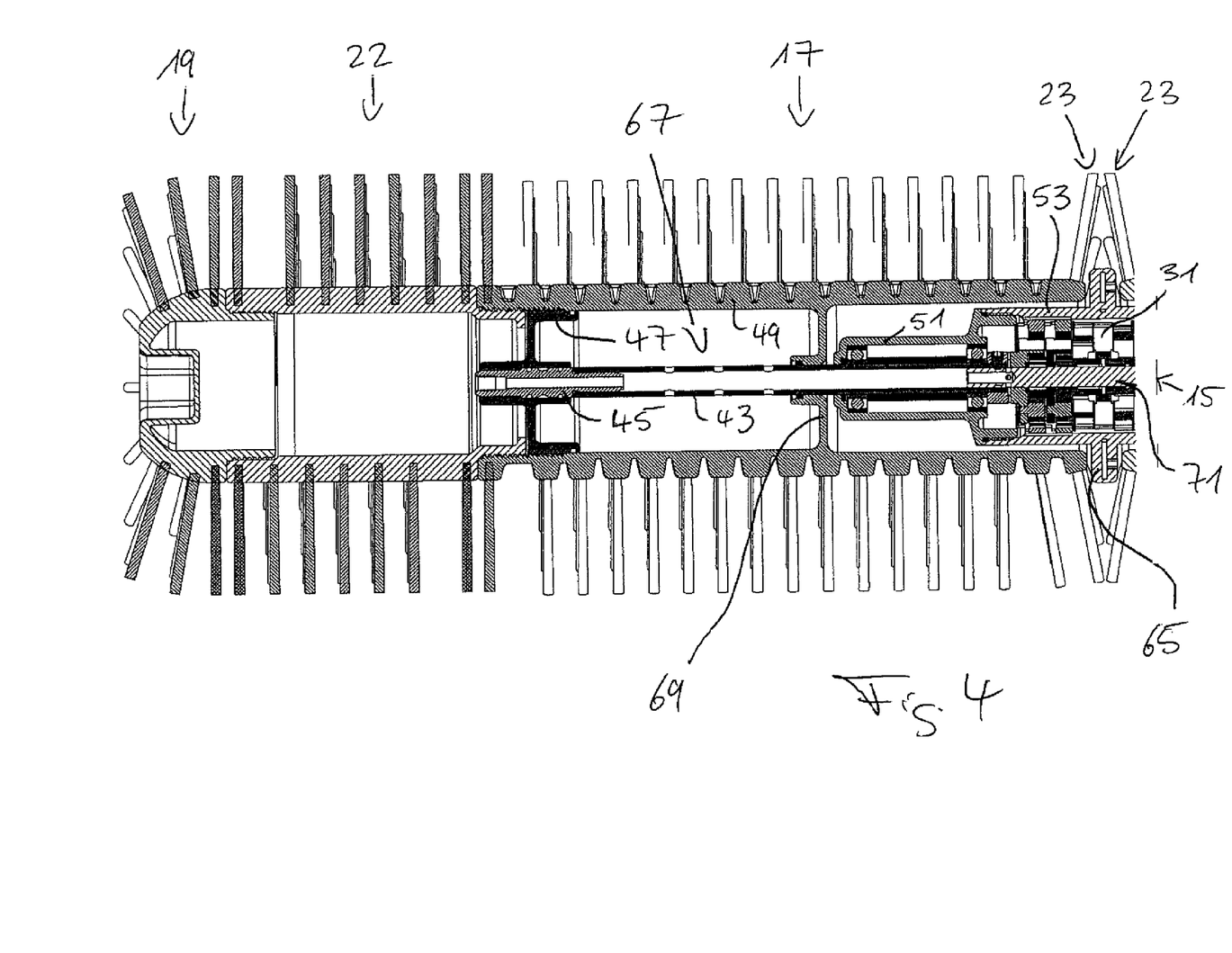
FIG. 4 a further embodiment of a brush arrangement in accordance with the invention.

As in particular FIG. 4 shows, the base module 17 between the housing 53 of the base part 11 and the outer jacket 49 of the base module 17 includes a carrier rod 43 which is coupled via a connection piece 45 to a plug 47 which is screwed into the axial end region of the base module 17 and thus carries the outer jacket 49 in the axial end region. The outer jacket 49 is supported at a further axially inwardly disposed region by means of an integral holding section 69 which is supported on the carrier rod 43.

The carrier rod 43, and thus the base brush module 17 and the coupled further brush modules 22, 15, are set into rotation by means of the fluid drive 15 whose structure will not be looked at in detail here.

The fluid drive 15 includes a central drive member 31 in the form of a turbine wheel or of a bucket wheel which is acted on by means of the fluid jet exiting the nozzle 27 (cf. FIG. 2) and is thus set into rotation. Two planetary transmissions axially connected after one another are arranged on each side of this drive member 31. The planetary gear carrier of the first planetary transmission serves as a sun gear for the second planetary transmission. The two axially outer planetary gear carriers each drive the carrier rod 43. The carrier rods 43 thus serve as drive shafts which are connected to one another via a common, central carrier shaft 71 which extends through the fluid rotary drive.

The mentioned carrier arrangement 67 moreover includes a carrier cage 51 which is axially connected at the end side to the housing 53 of the base part 11.

Figure 5:
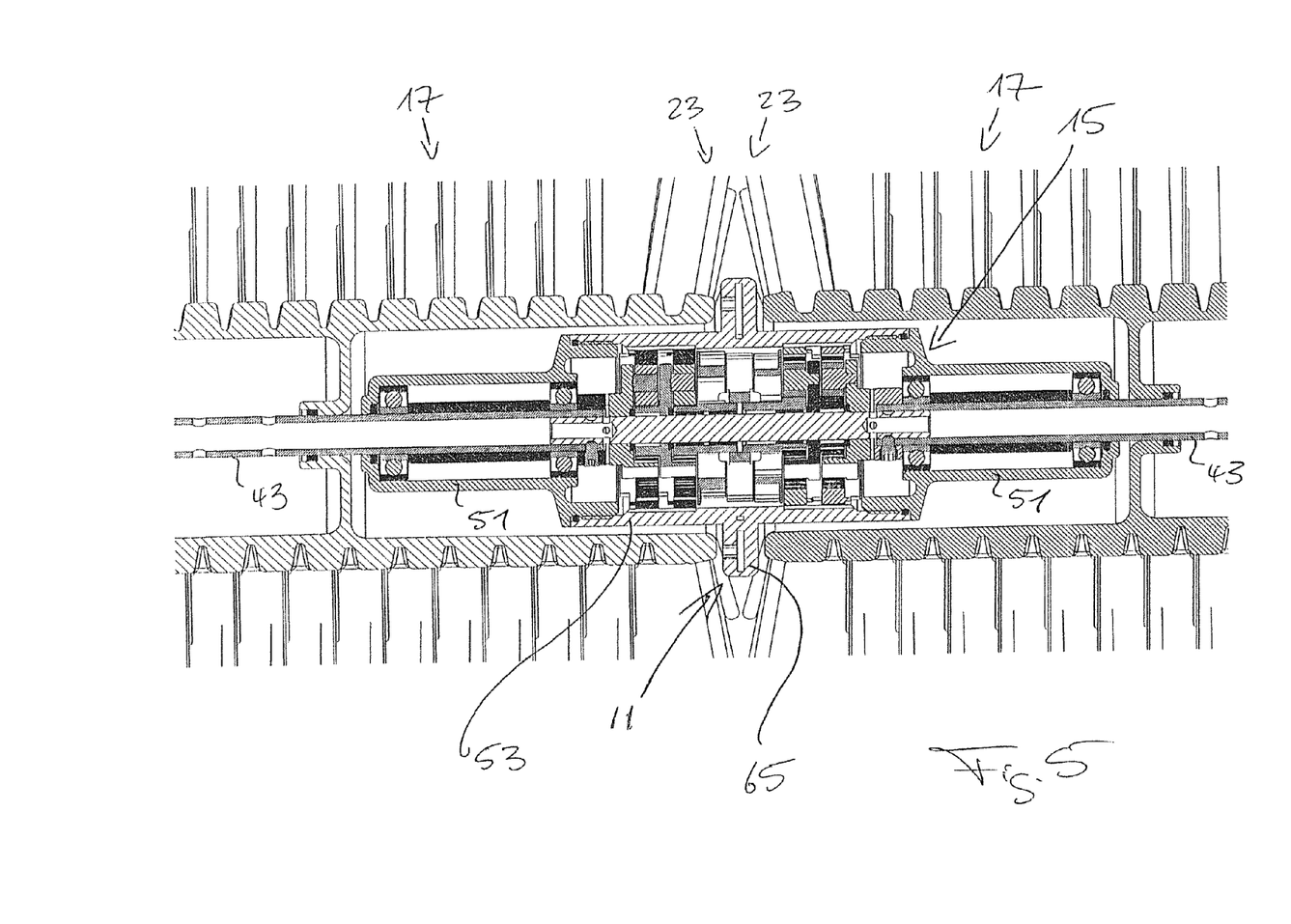
FIG. 5 another representation of the brush arrangement of FIG. 4.

As can also be seen from FIG. 5, the two base modules 17 of the brush arrangements 13 are made in the same construction and are arranged at both sides of the flat flange section 65 of the base part 11, with the two base modules 17 being set into rotation by means of the common fluid drive 15 formed symmetrically with respect to the flange section 65.

Deviating from the design shown in FIG. 2, the line 25 and the base part 11 are formed such that the line 25 can be rotated about its longitudinal axis relative to the base part 11 to be able to change the direction in which the fluid exits the nozzle 27 in this manner. The embodiment is in particular selected such that it is possible to switch between two different fluid outlet directions in that the line 25 and with it the nozzle 27 is rotated by 180°. The two rotational positions can be easily set for a user, e.g. by a latch mechanism and can in particular be made clearly tangibly.

Depending on the rotational position of the line 25 and thus the outlet direction of the fluid from the nozzle 27, a drive member of the fluid drive is acted on either in the one direction of rotation or in the opposite direction of rotation so that the user can switch over between a forward operation and a reverse operation with respect to the direction of rotation of the brush arrangements 13 by a simple rotation of the line 25.

Furthermore, the cleaning apparatus in accordance with the invention can be provided with a splash protection device (not shown) such as was explained in the introduction part.

The invention claimed is:
1. An apparatus for cleaning surfaces, comprising
a cleaning head which includes at least one base part and at least two brush modules which form a brush arrangement, said base part and said brush modules being axially aligned with each other and said at least two brush modules being rotatable about a common axis which extends through said base part, said brush modules being rotatable relative to said at least one base part, a fluid drive for at least one of said brush modules which is at least partly integrated into the base part and which is designed to convert the flow energy of a fluid supplied to the base part under pressure into a cleaning movement of the at least one of said brush modules, wherein a set of additional brush modules is provided for changing the working width of said brush arrangement, said additional brush modules being axially coupled to each other and to said at least two brush modules to form said brush arrangement.

2. An apparatus in accordance with claim 1, wherein the brush arrangement is a cylindrical brush roller.

3. An apparatus in accordance with claim 1, wherein the set includes at least one base module coupled to the base part, at least one axially outwardly closed end module as well as at least one intermediate module coupled or couplable between the base module and the end module.

4. An apparatus in accordance with claim 1, wherein the brush modules in said set of additional brush modules are coupled or couplable to one another by screwing.

5. An apparatus in accordance with claim 1, wherein the fluid drive is divided between a driven part associated with the base part and a driving part associated with a fluid supply device, with the two parts of the fluid drive being releasably coupled to one another.

6. An apparatus in accordance with claim 1, wherein the fluid drive has an elongated fluid expulsion member which is arranged in the region of the base part.

7. An apparatus in accordance with claim 6, wherein the elongated fluid expulsion member includes a nozzle.

8. An apparatus in accordance with claim 6, wherein the elongated fluid expulsion member is of pin-shape.

9. An apparatus in accordance with claim 6, wherein the elorigatd fluid expulsion member extends radially or tangentially with respect to said common axis of rotation at least in the region of the base part.

10. An apparatus in accordance with claim 6, wherein the elongated fluid expulsion member is arranged at the end of a fluid supply device which is coupled to the base part by plugging together.

11. An apparatus in accordance with claim 6, wherein the elongated fluid expulsion member is arranged at the end of a lance which is coupled to the base part by plugging together.

12. An apparatus in accordance with claim 6, wherein the elongated fluid expulsion member is replaceable.

13. An apparatus in accordance with claim 12 and comprising a set of a plurality of elongated fluid expulsion members each having different flow cross-sections.

14. An apparatus in accordance with claim 1, wherein the fluid drive has a drive member driven by the fluid.

15. An apparatus in accordance with claim 14, wherein the drive member is a turbine or a bucket wheel.

16. An apparatus in accordance with claim 1, wherein the fluid drive can be operated in different directions of rotation by rotation of a fluid supply line and/or of a fluid expulsion member.

17. An apparatus in accordance with claim 16, wherein the different directions of rotation are achieved by rotation of the fluid supply line and/or of the fluid expulsion member by 180° about a longitudinal axis of the fluid supply line and/or of the fluid expulsion member.

18. An apparatus in accordance with claim 1, wherein a fluid supply line carrying a fluid expulsion member disposed in front of a flow outlet which extends at least substantially radially with respect to said common axis of rotation of the brush arrangement and the flow outlet is aligned such that the fluid drive is acted on in different directions of rotation in dependence on the rotational position of the fluid expulsion member.

19. An apparatus in accordance with claim 18, wherein the fluid drive is a turbine or a bucket wheel.

20. An apparatus in accordance with claim 1, wherein the brush arrangement is provided with a splash protection device.

21. An apparatus in accordance with claim 20, wherein the brush arrangement includes bristles and wherein the splash protection device includes a scraper which projects at least partly into the bristles and relative to which the brush arrangement moves during a cleaning operation and which the bristles abut during the cleaning operation.

22. An apparatus in accordance with claim 1, wherein a splash protection device includes a cover disposed outside of bristles of the brush arrangement.

23. An apparatus in accordance with claim 1, wherein the base part includes a reinforcement which is surrounded at least regionally by an outer part of plastic.

24. An apparatus in accordance with claim 23, wherein the reinforcement is a plate-shaped or disk-shaped reinforcement.

25. An apparatus in accordance with claim 23, wherein the reinforcement is a metal reinforcement.

26. An apparatus in accordance with claim 23, wherein the base part is cast in plastic or overmolded by plastic.

27. An apparatus for cleaning surfaces, comprising
a cleaning head which includes at least one base part and at least two brush arrangements, said base part and said brush arrangements being axially aligned with each other and rotatable about a common axis and rotatable relative to said base part,
a fluid drive for at least one of said brush arrangements which is integrated into the base part and which is designed to convert the flow energy of a fluid supplied to the base part under pressure into a cleaning movement of the at least one of said brush arrangements,
wherein the fluid drive has a non-threaded elongated fluid expulsion member which is arranged in the base part,
wherein the non-threaded elongated fluid expulsion member is slidably and removably insertable into a radially extending feed section of the base part.

28. An apparatus for cleaning surfaces, comprising
a cleaning head which includes at least one base part and at least two brush arrangements, said base part and said a least two brush arrangements being axially aligned with each other and rotatable about a common axis and rotatable relative to said base part,
a fluid drive for at least one of said at least two brush arrangements which is integrated into the base part and which is designed to convert the flow energy of a fluid supplied to the base part under pressure into a cleaning movement of the at least two brush arrangements,
wherein the fluid drive has an elongated fluid expulsion member,
said base part having a receiving section which extends through said base part substantially radially outwardly relative to said common axis and is open at the radial outer end of said receiving section, said fluid expulsion member being insertable through said radial outer end of said receiving section and into said housing in a radially inward direction relative to said common axis to removably attach said fluid expulsion member to said base part.

* * * * *